(12) United States Patent
Ito et al.

(10) Patent No.: US 7,408,677 B2
(45) Date of Patent: Aug. 5, 2008

(54) PROFILE CREATION METHOD, PROFILE CREATION APPARATUS, AND MEDIUM RECORDING A PROFILE CREATION PROGRAM

(75) Inventors: Takashi Ito, Nagano-ken (JP); Makoto Fujino, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 780 days.

(21) Appl. No.: 10/957,322

(22) Filed: Sep. 30, 2004

(65) Prior Publication Data

US 2005/0237547 A1    Oct. 27, 2005

(30) Foreign Application Priority Data

Oct. 2, 2003   (JP)   ............... 2003-344812

(51) Int. Cl.
- H04N 1/48    (2006.01)
- H04N 1/56    (2006.01)
- H04N 1/60    (2006.01)
- G06K 9/00    (2006.01)

(52) U.S. Cl. .................. 358/1.9; 358/504; 358/518; 358/525; 382/162; 382/167; 382/298; 382/300

(58) Field of Classification Search ............... 358/1.9, 358/504, 518, 525, 1.15, 527, 521, 523; 382/162, 382/167, 298, 300; 345/590

See application file for complete search history.

(56) References Cited

U.S. PATENT DOCUMENTS

| | | | | |
|---|---|---|---|---|
| 6,075,888 | A * | 6/2000 | Schwartz | 382/167 |
| 6,888,648 | B2 * | 5/2005 | Odagiri et al. | 358/1.9 |
| 6,919,975 | B1 * | 7/2005 | Haikin et al. | 358/518 |
| 7,003,151 | B2 * | 2/2006 | Shimada | 382/162 |
| 7,035,454 | B2 * | 4/2006 | Kumada et al. | 382/162 |
| 7,271,933 | B2 * | 9/2007 | Kato et al. | 358/1.9 |

FOREIGN PATENT DOCUMENTS

JP    2002-027272    1/2002

OTHER PUBLICATIONS

Abstract of Japanese Patent Publication No. 2002-027272, Pub. Date: Jan. 25, 2002, Patent Abstracts of Japan.

* cited by examiner

*Primary Examiner*—David K Moore
*Assistant Examiner*—Charlotte M Baker
(74) *Attorney, Agent, or Firm*—Martine Penilla & Gencarella, LLP

(57) ABSTRACT

There has been a problem of causing too large a failure in extrapolated portions due to the multiple linear regression analysis or the 3*3 matrix optimization. An interpolation is performed to find a reduced Lab range and a reduced Lab gamut corresponding to a reduced RGB range and a reduced RGB gamut. The reduced RGB range and the reduced RGB gamut are compressed so that an RGB range and an RGB gamut are fit into an RGB gamut. A magnification ratio α is found for each grid according to relationship between the reduced Lab gamut and a Lab gamut. Then, a magnification ratio for the surface of the reduced Lab range is assumed to be that for the surface of the reduced Lab gamut. The reduced Lab range is enlarged to provide a Lab range. A magnification ratio α' is found according to the relationship between the surface of the Lab range and the reduced Lab range. When a grid exists in the reduced Lab gamut, the magnification ratio α is used to enlarge the Lab value of the grid and provide the Lab range. When the grid does not exist in the reduced Lab gamut, the grid is enlarged by using the magnification ratio α' to create an ICC profile.

7 Claims, 10 Drawing Sheets

PROFILE CREATION METHOD, PROFILE CREATION APPARATUS, AND MEDIUM RECORDING A PROFILE CREATION PROGRAM

BACKGROUND OF THE INVENTION

1. Field of the Invention

The present invention relates to a profile creation method, a profile creation apparatus, and a medium recording a profile creation program for creating a profile which defines correspondence between a first color space range represented by a device-dependent component coordinate and a second color space range represented by a device-independent component coordinate corresponding to the first color space range.

2. Description of Related Art

There are known such type of apparatuses that determine polynomial coefficients by the multiple linear regression analysis for extrapolation, optimize 3*3 matrices for extrapolation, and create an input chart for the ease of extrapolation. A similar apparatus is known as disclosed in JP-A No. 27272/2002, for example.

The above-mentioned conventional apparatuses cause too large a failure in extrapolated portions due to the multiple linear regression analysis or the 3*3 matrix optimization. Though input charts for easy extrapolation are available, the extrapolation may be forced to use a patch chart that becomes cylindrical in the saturation value space, for example. Charts are limited to such format. In addition, it is very difficult to create an accurate input chart that forms a cylindrical saturation value space.

SUMMARY OF THE INVENTION

The present invention has been made in consideration of the foregoing. It is therefore an object of the present invention to provide a profile creation method, a profile creation apparatus, and a profile creation program capable of creating a profile with a few failures in an extrapolation region.

In order to achieve the above-mentioned object, the present invention provides a profile creation apparatus for creating a profile to define correspondence between a first color space range expressed by a device-dependent component coordinate and a second color space range expressed by a device-independent component coordinate corresponding to the first color space range. For this purpose, a first gamut acquisition step is first used to acquire a first gamut for the first color space range based on a chart supplied from a specified input device. A second gamut acquisition step is then used to measure a color in the chart and acquiring a second gamut for the second color space range. The present invention uses a first reduced region acquisition step to acquire a reduced first color space range by reducing the first color space range into the first gamut and acquire a reduced first gamut by reducing the first gamut based on a corresponding reduction ratio.

A second reduced region acquisition step is used to acquire a reduced second color space range and a reduced second gamut corresponding to the reduced first color space range and the reduced first gamut based on a specified interpolation algorithm. A magnification ratio calculation step is used to calculate a first magnification ratio corresponding to the second gamut for each grid in the acquired reduced second gamut and calculate a second magnification ratio from a reduced second color space range to a second color space range based on the calculated first magnification ratio. A profile creation step is used to calculate a second color space range based on the calculated second magnification ratio and create a profile defining correspondence between the first color space range and the second color space range based on a calculation result. Such technique enables creation of the profile hardly subject to a failure due to extrapolation.

There is provided an example of the technique to reduce the first color space range into the first gamut. The first reduced region acquisition step reduces the first color space range into a first gamut by allowing at least one point on an outline of the reduced first color space range to correspond to an outline of the first gamut.

There is provided an example of the technique to calculate each magnification ratio using the magnification ratio calculation step. The magnification ratio calculation step calculates the first magnification ratio and the second magnification ratio based on a polar coordinate system in a color space for the grid.

There is provided a specific technique to calculate the second magnification ratio using the magnification ratio calculation step. The magnification ratio calculation step calculates the second magnification ratio using an interpolation operation corresponding to the first magnification ratio.

There is provided an example of the technique to calculate the magnification ratio for a grid available in the reduced second color space range outside the reduced second gamut. The magnification ratio calculation step forms a line by connecting a reduction center to a coordinate of a grid in the reduced second color space range outside the reduced second gamut, allows the line to intersect with a surface of the reduced second gamut at an intersecting point, and uses a magnification ratio obtained from this intersecting point as a second magnification ratio.

There is provided an example of solving a case where the calculated second color space range exceeds an allowable range. When the calculated second color space range exceeds an allowable range, the profile creation step creates the profile by compressing the calculated second color space range to the allowable range.

It is to be distinctly understood that the above-mentioned profile creation method can be implemented as a profile creation apparatus to embody the method. Further, it is to be distinctly understood that the present invention is embodied as a program allowing a computer to be able to implement a function equivalent to the profile creation apparatus. Media to record the program include various computer-readable media such as a flexible disk, CD-ROM, magnetic optical disk, IC card, ROM cartridge, punched card, printed material with a printed code such as a bar code, computer's internal storage (memory such as RAM and ROM), and external storage.

DETAILED DESCRIPTION OF THE PREFERRED EMBODIMENTS

The embodiment of the present invention will be described according to the following topics.

Figure 1:
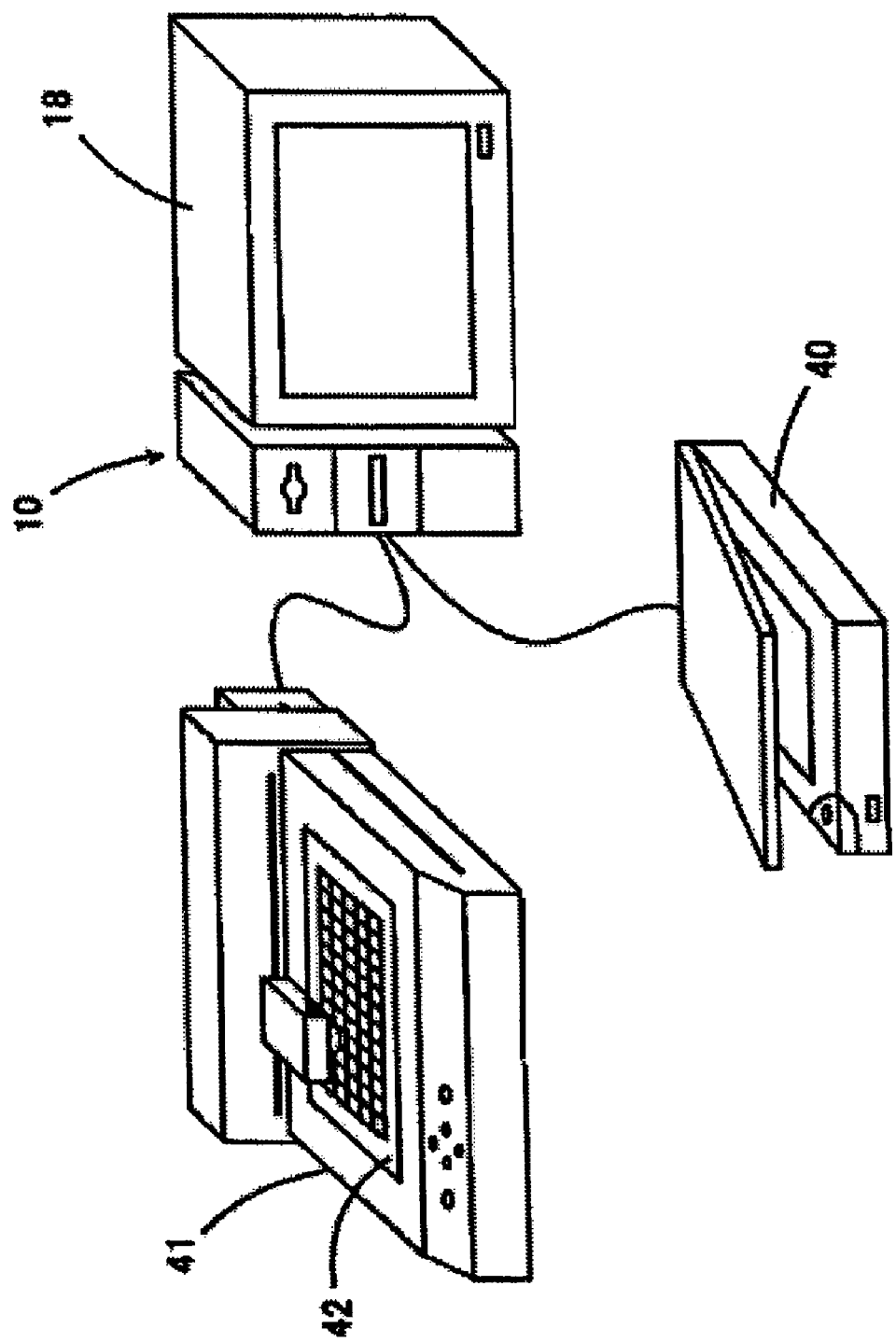
FIG. 1 is a configuration diagram showing the external configuration of a profile creation apparatus.
Figure 2:
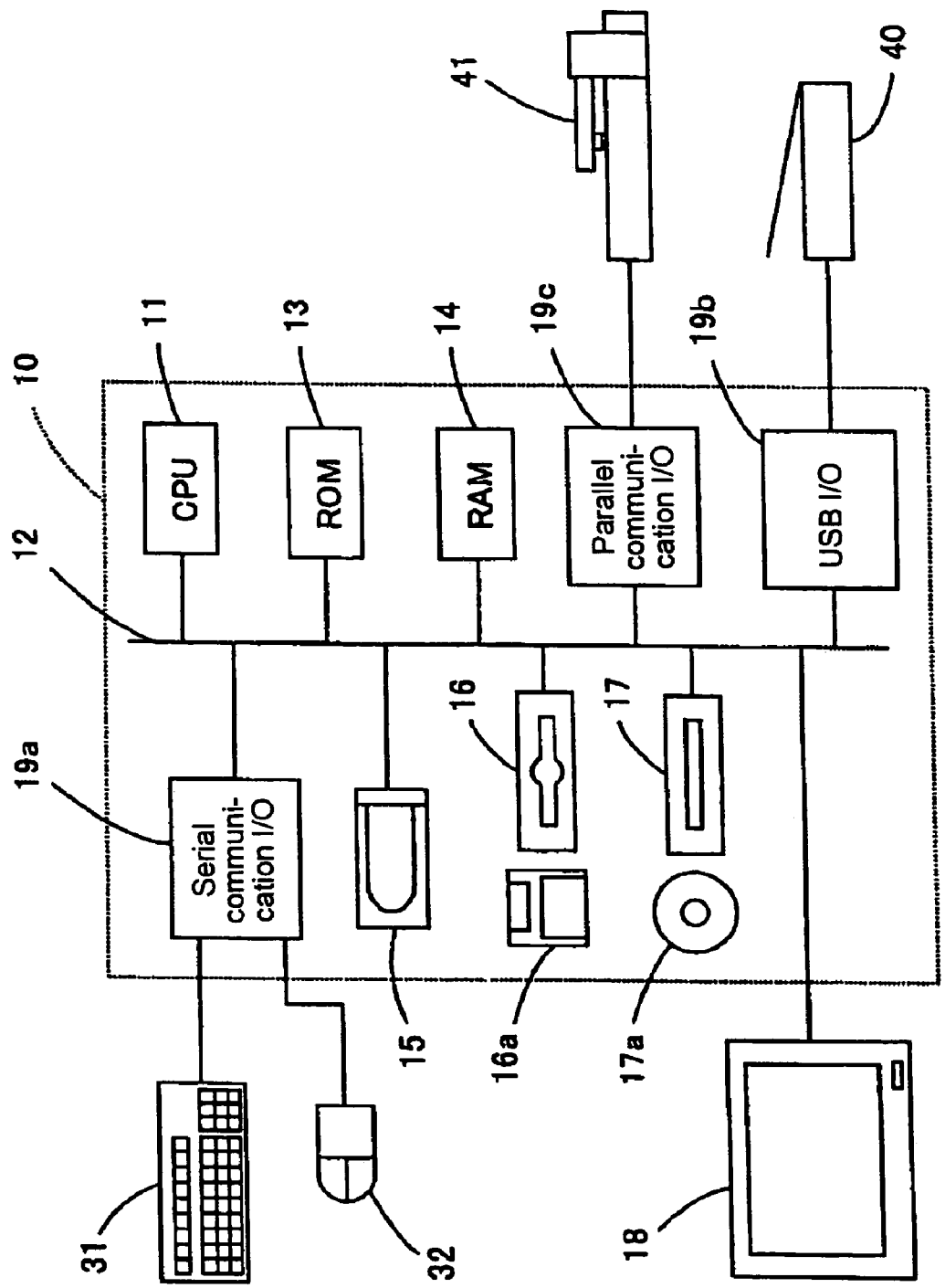
FIG. 2 is a configuration diagram showing the internal configuration of the profile creation apparatus.

(1) Profile creation apparatus configuration
(2) Profile creation algorithm
(3) Conclusion
(1) Profile Creation Apparatus Configuration FIG. 1 is a schematic perspective view showing the hardware configuration of the profile creation apparatus according to an embodiment of the present invention. FIG. 2 is a block diagram showing major parts. In FIGS. 1 and 2, a scanner 40 is connected to a computer 10 via a USB cable. A calorimeter 41 is connected to the computer via a parallel cable. The scanner 40 has a light emitting diode and an image sensor though not shown in FIGS. 1 and 2. The scanner 40 performs a scan based on instructions supplied from the computer 10 via the USB cable, generates and outputs image data representing each pixel in three primary colors RGB. During scanning, the scanner 40 activates the light emitting diode by moving it to radiate the light to scan objects such as a color chart mounted on a scanning plane. The image sensor moves to detect reflected light from the scan object. The scanner 40 generates pixel data represented in 256 levels for each of three primary colors RGB based on an output signal from the image sensor.

The embodiment uses a color chart 42 compliant with the ANSI standard to create an ICC profile. ANSI-standard color charts include reflective and transparent documents. If the scanner 40 operates in a mode of scanning transparent documents, a similar ICC profile can be created. Of course, the other color charts can be used alike. Nevertheless, ANSI compliant charts are preferable because they provide the proper number of colors, appropriately scatter colors within a color region reproducible by the scanner 40, and are easily available. The scanner 40 is a preferred example of input apparatuses. However, the present invention is not limited thereto and can be applied to the ICC profile creation for various image data input apparatuses such as digital cameras.

The calorimeter 41 has a spectrophotometer given freedom to two-dimensionally move on a mounting plane of the color chart 42. The calorimeter 41 outputs coordinate values (Lab values) in the CIELab color system for each color patch based on an output signal from the spectrophotometer. The spectrophotometer moves on the mounting plane of the color chart 42 and scans each color patch to acquire coordinate values in the device-independent color space for each color patch in the color chart 42. Of course, transparent color charts can be also used. For the purpose of creating a profile, it is possible to use color charts not compliant with the ANSI standard.

The calorimeter 41 is used to acquire coordinate values in the device-independent color space for color patches of the color chart 42. In consideration of color changes in the color chart 42, it is preferable to use the calorimeter 41 each time the ICC profile is created. Considering that the color chart 42 is compliant with a specified standard, it may be possible to allow the ICC profile to be created by a user who does not have the colorimeter 41. In such case, Lab values corresponding to color patches are supplied by a flexible disk and the like. The colorimeter 41 may measure colors not only in the Lab space, but also in the XYZ space and later perform conversion between the color spaces. When an ICC profile to be created is not compliant with the ICC standard, it is also possible to use a space other than the Lab space as the reference space.

The computer 10 has a CPU 11 as a core of operation processes. The CPU 11 can access ROM 13 containing BIOS and RAM 14 via a system bus 12. The system bus 12 connects with external storage apparatuses such as a hard disk drive 15, a flexible disk drive 16, and a CD-ROM drive 17. The hard disk drive 15 stores an operating system (OS) 20 and an application (APL) that are transferred to the RAM 14. The CPU 11 accesses the ROM 13 and the RAM 14 as needed to execute the software. According to the embodiment, the profile creation program can be transferred from the hard disk drive 15 to the RAM 14 and executed likewise.

A serial communication I/O 19a connects with input operation devices such as a keyboard 31 and a mouse 32. The serial communication I/O 19a also connects with a display 18 for display purpose via a video board (not shown). The serial communication I/O 19a is capable of connection with the scanner 40 via a USB I/O 19b and is capable of parallel connection with the colorimeter 41 via a parallel communication I/O 19c. The configuration of the computer 10 is simplified but may comply with the general configuration for personal computers and workstations.

Of course, the present invention is not limited to personal computers. While the embodiment uses a so-called desktop computer, notebook or mobile computers may be used. The computer 10 can be connected to the scanner 40 and the calorimeter 41 via not only communication interfaces such as the USB I/O 19b and the parallel communication I/O 19c, but also various types of connection modes such as ordinary serial interfaces, SCSI and IEEE1394 connections. The same applies to any connection modes that may be developed in the future.

In this example, the hard disk drive 15 stores individual programs constituting the profile creation program. Recording media are not limited thereto. For example, a flexible disk 16a or a CD-ROM 17a may be used for this purpose. The computer 10 reads programs recorded on these recording media via a flexible disk drive 16 and a CD-ROM drive 17. The programs are installed on the hard disk drive 15. The programs are read from the hard disk drive 15 to the RAM 14 to control a host computer. Recording media are not limited thereto and may include magnetic optical disks. Further, it is possible to use nonvolatile memory such as flash cards as a semiconductor device. Even when an access is made to an external file server for downloading via a modem and a communication line, it is obvious that the computer's storage section can function as a recording medium.

Figure 3:
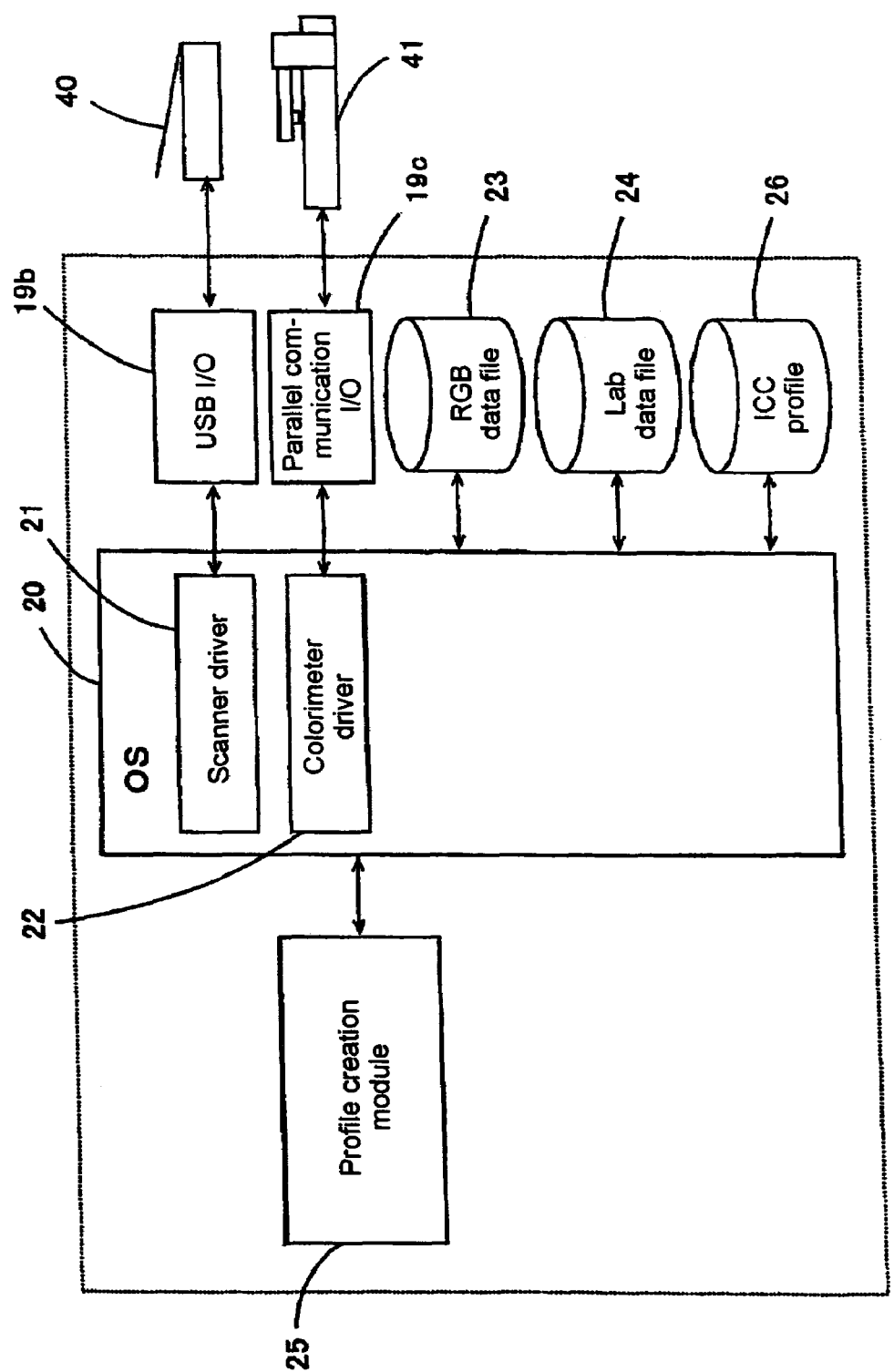
FIG. 3 is a configuration diagram showing the software configuration of the profile creation apparatus.

FIG. 3 is a block diagram showing the configuration of major parts of the computer 10 for creating the ICC profile. In FIG. 3, a scanner driver 21 is installed in an OS 20 of the computer 10. The scanner driver 21 controls the scanner 40 via the USB I/O 19b. When the scanner 40 is driven under control of the scanner driver 21, the scanner 40 outputs RGB pixel data that is then input to the computer 10 via the USB I/O 19b. The scanner driver 21 stores the data as an RGB file 23 in the hard disk drive 15. Each color patch of the color chart 42 contains an alphabetic letter and a numeric corresponding to each other. The RGB data file 23 stores data by maintaining the correspondence between the data and the associated color patch.

A colorimeter driver 22 is installed in the OS 20 and controls the calorimeter 41 via the parallel communication I/O 19c. Under control of the colorimeter driver 22, the colorimeter 41 is driven and outputs coordinate values in the device-independent color space. The values are input via the parallel communication I/O 19c. The colorimeter driver 22 stores data as a Lab data file 24 in the hard disk drive 15. The Lab data file 24 also stores data by maintaining the correspondence between the data and the associated color patch in the color chart 42.

According to the embodiment, a profile creation module 25 is executed with the RGB data file 23 and the Lab data file 24 stored in the hard disk drive 15 to create an ICC profile compliant with the ICC standard. The created ICC profile is stored as an ICC profile 26 in the hard disk drive 15. Operations of the profile creation module 25 will be described later.

Figure 4:
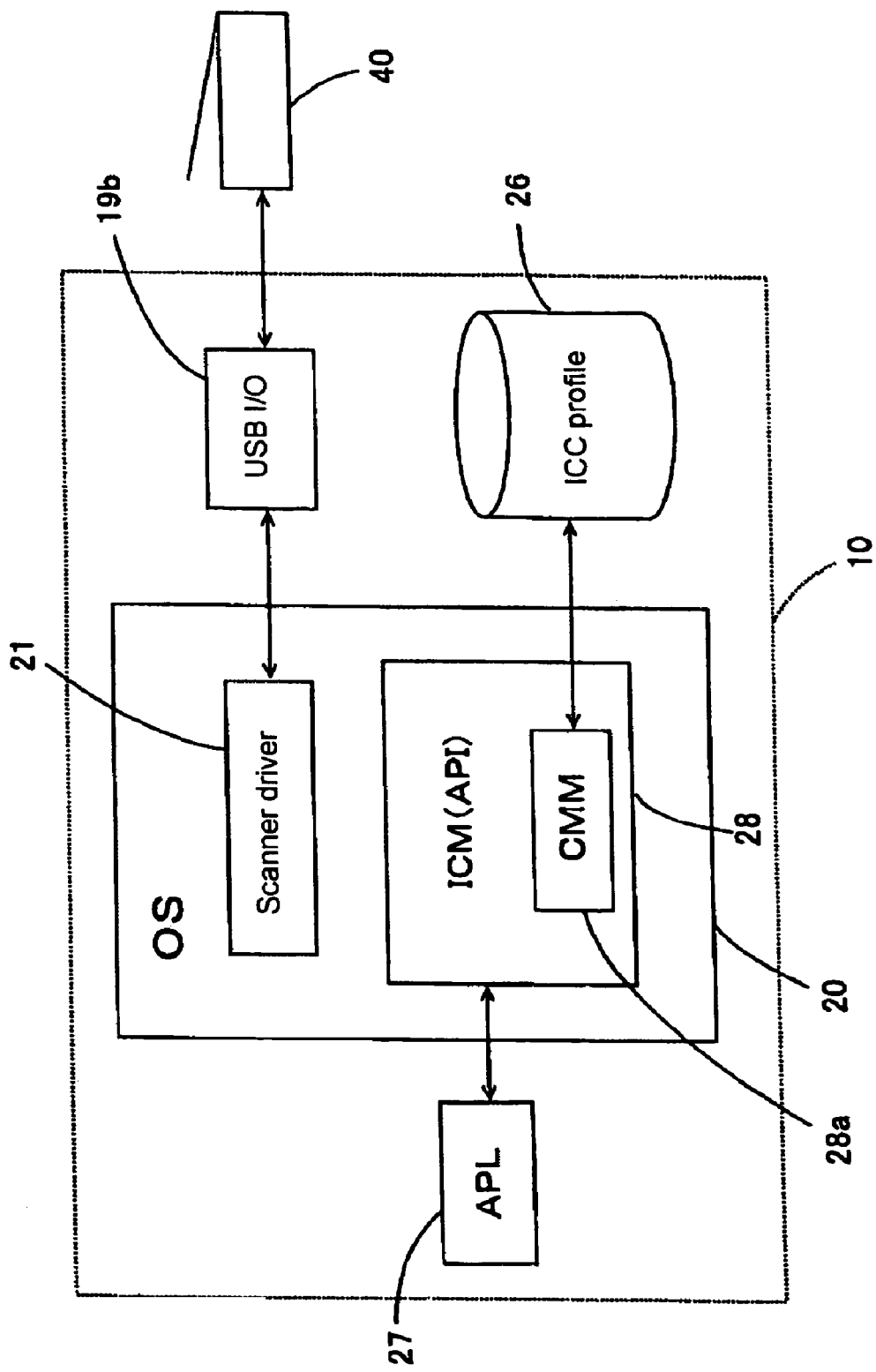
FIG. 4 is a configuration diagram showing the software configuration of the profile creation apparatus.

When capturing image data, the scanner 40 references the ICC profile 26 to perform an interpolation. In this manner, RGB values output from the scanner 40 correspond to coordinate values in the Lab space as a device-independent color space. Accordingly, almost the same color is used for the scan image, display, and printout as long as the printer and the display use ICC standard complaint profiles and the scanner 40 use the ICC profile 26. At this time, the calorimeter 41 is not needed any more. FIG. 4 is a block diagram showing an example of the configuration for scan using the ICC profile. In FIG. 4, the computer 10 has the same configuration as an ordinary personal computer used for the above-mentioned profile creation. The computer 10 references the ICC profile when using the scanner 40.

An APL 27 is installed in the computer 10. Using the APL 27, a user issues instructions to capture images and drives the scanner 40 to acquire intended image data. At this time, the OS 20 uses an ICM (Image Color Management) 28 to process colors of the image data handled by the APL 27. The ICM 28 is an API (Application Program Interface) provided with a CMM (Color Management Module) 28a that converts input and output data from each device into Lab values by referencing the ICC profile.

When the APL 27 generates an instruction to capture an image, the scanner is driven under control of the scanner driver 21 to input given RGB data via the USB I/O 19b. The CMM 28a of the ICM 28 references the ICC profile to find Lab values corresponding to the RGB data. Colors are output to the printer and the display based on the Lab values. Therefore, color data for the devices are always handled through the intermediation of the Lab values, i.e., values for the device-independent color space. The color data are independent of devices and operating systems. Some colors are treated as approximately the same.

The embodiment discloses a technique to predict colors without failure in the ICC profile creation, especially, in an extrapolation algorithm. Generally, it is almost impossible to cover all device RGB values representable on a device using the saturation value space i.e., the color chart 42 that can be input to the input device such as the scanner 40. The color chart 42 input to devices is generally available as the IT8 chart for the scanner 40 or the Macbeth color checker for DSC. Accordingly, it is necessary to predict saturation values corresponding to the entire device RGB by extrapolating outside the input saturation value space. Generally, however, the extrapolation algorithm provides no available data near an expected extrapolation value and causes an extrapolation result to fail in most cases. This tendency becomes more obvious at a point more distant from the input saturation value space. To solve this problem, an algorithm is executed in the profile creation module 25 and aims at minimizing a failure in the extrapolation region.

(2) Profile Creation Algorithm

The following describes the basic concept of the algorithm executed in the profile creation module 25. The algorithm implements the extrapolation by once reducing an RGB range and an RGB gamut. The embodiment uses a term "gamut" to represent a region of saturation values acquired by input to an input device such as the scanner 40. A gamut of saturation values acquired from the input color chart 42 is referred to as a Lab gamut (second gamut according to the present invention). A gamut acquired from the device is referred to as an RGB gamut (first gamut according to the present invention). The range of RGB values representable on input devices is assumed to be 0 to 255. This range is referred to as an RGB range (first color space range according to the present invention). The entire Lab region is generated from color prediction in the RGB range and is referred to as a Lab range (second color space range according to the present invention).

Figure 5:
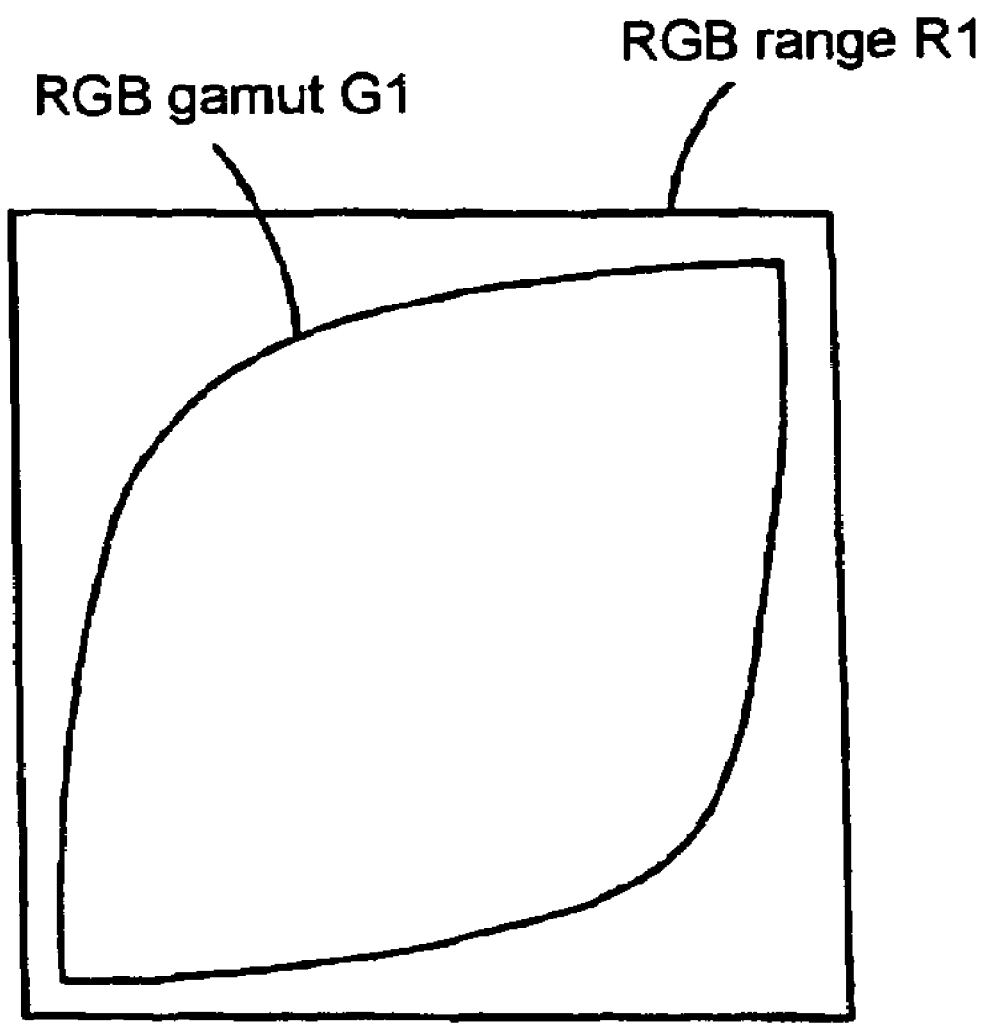
FIG. 5 is a configuration diagram showing the configuration of RGB gamut and range.
Figure 6:
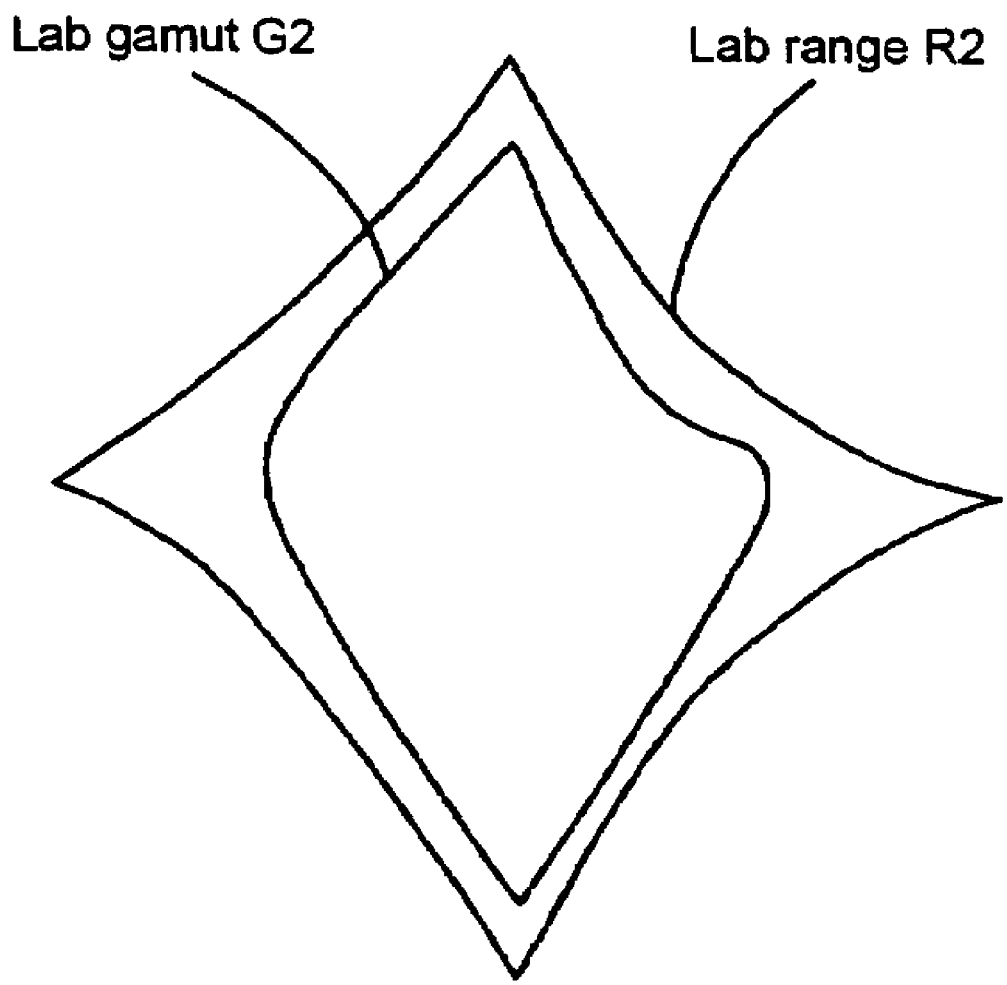
FIG. 6 is a configuration diagram showing the configuration of Lab gamut and range.
Figure 7:
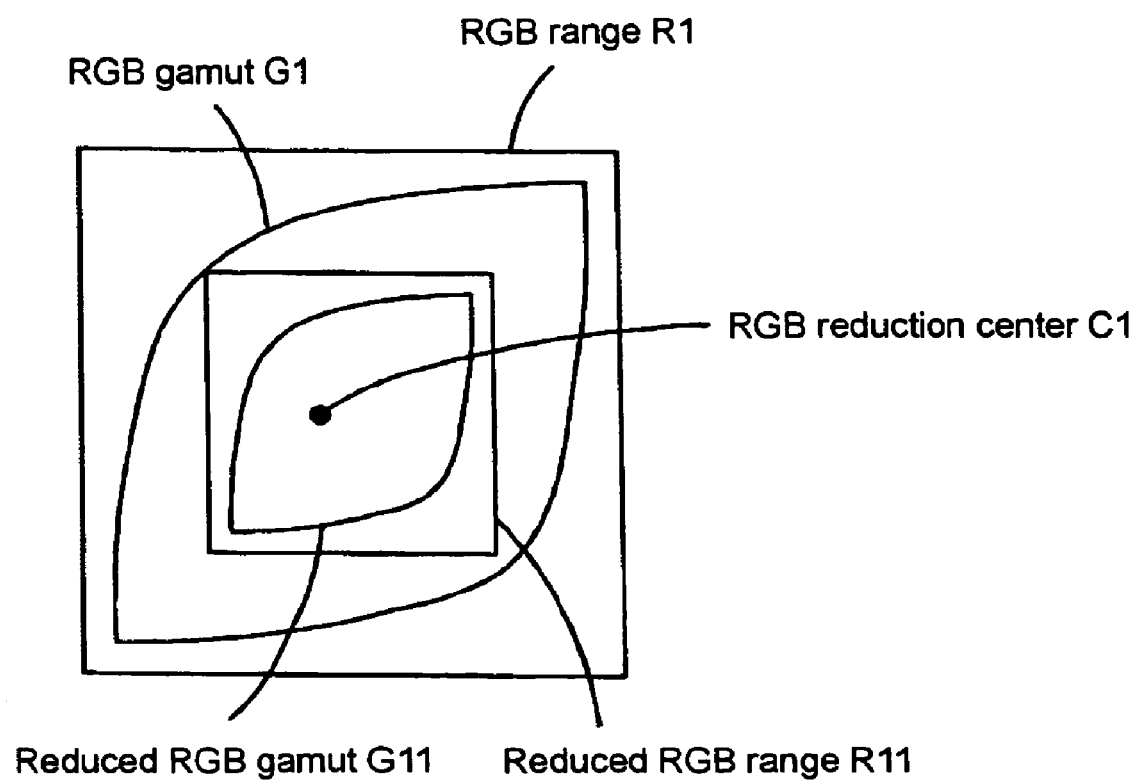
FIG. 7 is a configuration diagram showing the configuration of reduced RGB gamut and range.
Figure 8:
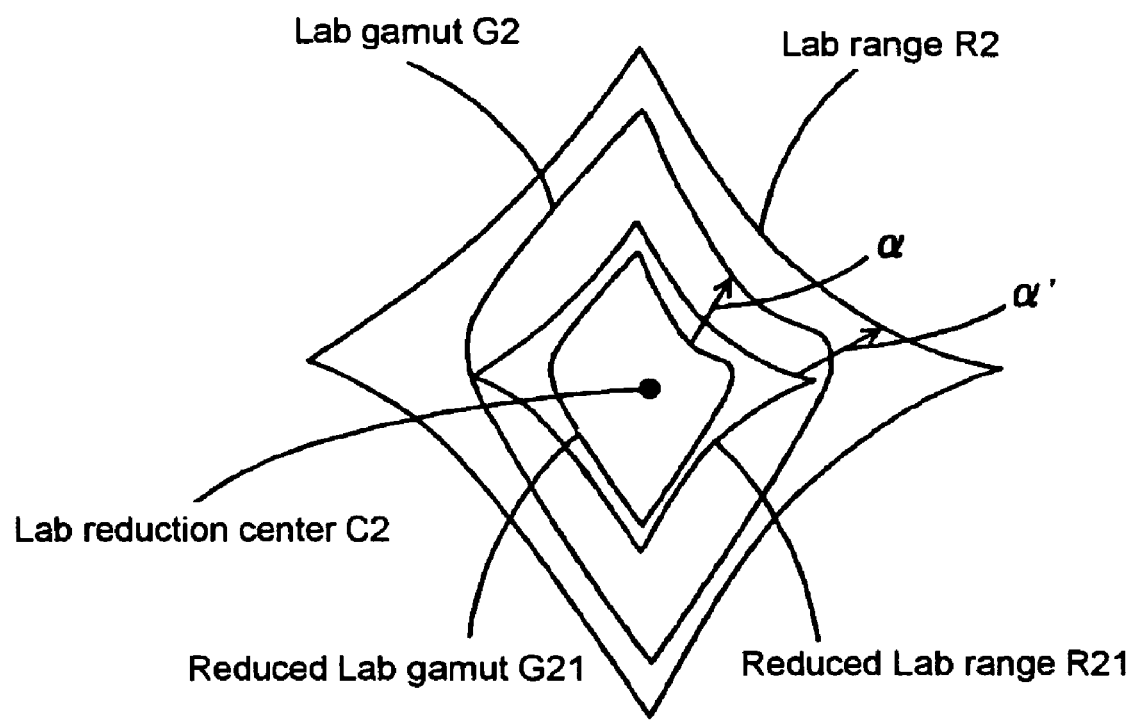
FIG. 8 is a configuration diagram showing the configuration of reduced Lab gamut and range.

FIGS. 5 and 6 exemplify shapes of the RGB range, the RGB gamut, the Lab range, and the Lab gamut. In FIG. 6, any points in a Lab gamut G2 can be found by interpolation using a predetermined RGB gamut G1 and the Lab gamut G2. However, an extrapolation needs to be performed to calculate any Lab values in the Lab range R2 and outside the Lab gamut G2. The RGB values corresponding to an outline of the Lab range R2 constitute an outline of the RGB range R1. As shown in FIGS. 7 and 8, an RGB reduction center C1 is assumed to be a point within the RGB range R1 and the RGB gamut G1. The RGB range R1 and the RGB gamut G1 are reduced at a constant reduction ratio against the RGB reduction center C1 so that the entire RGB range R1 fits into the RGB gamut G1. The reduced regions are referred to as a reduced RGB range R11 and a reduced RGB gamut G11, respectively. Since a minimum reduction ratio is preferable, the outline of the reduced RGB range R11 contains at least one point corresponding to the outline of the RGB gamut G1.

As mentioned above, the region fit into the RGB gamut G1 is capable of relatively accurate color prediction by interpolation. A given interpolation algorithm can be used to find a reduced Lab gamut G21 and a reduced Lab range R21 corresponding to the reduced RGB gamut G11 and the reduced RGB range R11. Since the RGB reduction center C1 also exists in the RGB gamut G1, an interpolation can be used to find a Lab reduction center C2 corresponding to the RGB reduction center C1. At this point, the reduced Lab gamut G21 and the Lab gamut G2 are known. It is understood that the Lab gamut G2 results from multiplying the reduced Lab gamut G21 by a against the Lab reduction center C2.

It is obvious that the magnification ratio $\alpha$ is not a constant and varies with the corresponding grid. The magnification ratio $\alpha$ cannot be a simple scaling factor, either. The detail will be described later. It should be noted that the Lab range R2 can be found by determining a magnification ratio $\alpha$ conforming to the magnification ratio $\alpha$ for the reduced Lab range R21. Therefore, the magnification ratio $\alpha'$ just needs to be found to find the Lab range R2 for an entire object of color prediction. The above-mentioned is the basic concept of the extrapolation algorithm based on the gamut reduction performed by the profile creation module 25 according to the embodiment. Since the embodiment uses the technique based on the reduced gamut extrapolation as mentioned above, a reduced gamut, if used, can be restored by using the magnification ratio $\alpha$ within the Lab gamut G2. It is possible to expect almost the same accuracy as for the ordinary interpolation. Failure-free extrapolation can be expected even outside the Lab gamut G2.

The following describes how to determine a reduction ratio for reducing the RGB range R1 to the reduced RGB range R1, reduce the RGB range R1 and the RGB gamut G1 using the scaling factor, and calculate the reduced Lab range R21 and the reduced Lab gamut G21. In this case, the RGB range R1 is first sampled at a proper interval to determine grids of the RGB range R1. For example, each of RGB is configured at the same interval of 17 grids. When the grids are reduced at a specified reduction ratio toward the reduction center (e.g., (R, G, B)=(125.5, 127.5, 127.5)), the range is assumed to reach the surface of the RGB gamut G1. All grids of the RGB range R1 are inspected to use the minimum value of reduction ratios for all the grids. In this manner, at least one point in the reduced RGB range R11 is found on the surface of the RGB gamut G1. The entire reduced RGB range R11 can be included in the RGB gamut G1. Therefore, the minimum reduction ratio is found from the grids' reduction ratios. Then, the found minimum reduction ratio is used to reduce the RGB range R1 and the RGB gamut G1 and find the reduced RGB range R1 and the reduced RGB gamut G11.

As mentioned above, both the reduced RGB range R11 and the reduced RGB gamut G11 exist in the RGB gamut G1. Therefore, an interpolation operation can be used to find the reduced Lab range R21 and the reduced Lab gamut G21. Accordingly, both are found by using grid data for the RGB gamut G1 and the Lab gamut G2. The Lab reduction center C2 corresponding to the RGB reduction center C1 is found by interpolating the RGB gamut G1 and the Lab gamut G2.

Figure 9:
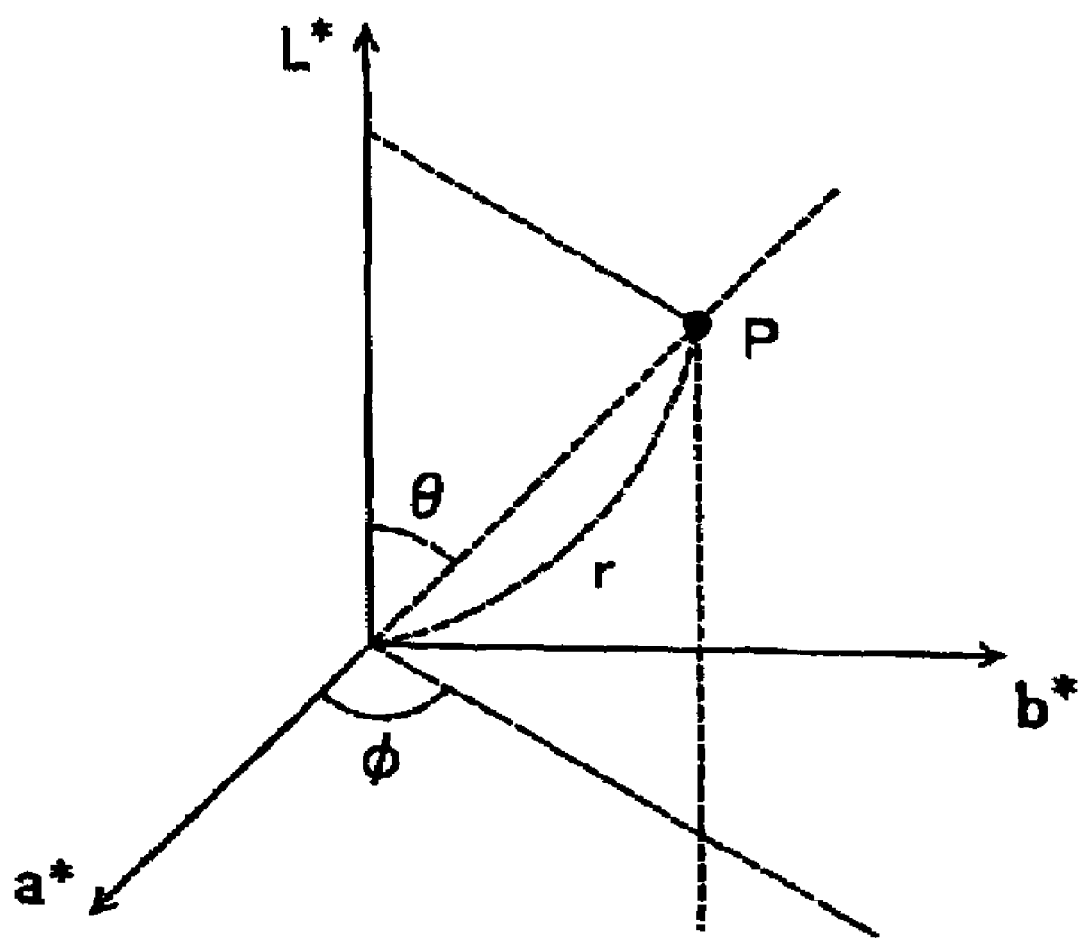
FIG. 9 is an explanatory diagram showing polar coordinates.

The next purpose is to determine a magnification ratio from the reduced Lab gamut G21 to the Lab gamut G2. In this case, as mentioned above, it is inconvenient to allocate a simple constant to the scaling factor for conversion from the reduced Lab gamut G21 to the Lab gamut G2. To solve this problem, the embodiment finds the scaling factor as two rotation angles and one scaling factor in a polar coordinate system. When a position vector P in the Lab space is represented as (Lp, ap, bp) according to the rectangular coordinate system, the position vector P is converted into the polar coordinate system like (Lp, ap, bp)=(rp, θp, φp). FIG. 9 shows this polar coordinate system. In FIG. 9, changes in the coordinate system can be expressed by the following equations.

[Equation 1] (1)
$$r_p = \sqrt{(L_p - L_c)^2 + (a_p - a_c)^2 + (b_p - b_c)^2}$$

[Equation 2] (2)
$$\phi_p = \tan^{-1}\frac{(b_p - b_c)}{(a_p - a_c)}$$

[Equation 3] (3)
$$\theta_p = \tan^{-1}\frac{\sqrt{(a_p - a_c)^2 + (b_p - b_c)^2}}{(L_p - L_c)}$$

In these equations, Lc, ac, and bc are coordinates of the Lab reduction center C2 represented in the rectangular coordinate system. A given grid P in the Lab gamut G2 and a grid P' in the reduced Lab gamut G21 are converted from the rectangular coordinate system to the polar coordinate system to find rp, θp, φp, rp', θp', and φp', respectively. These elements are used to find a magnification ratio for conversion from the reduced Lab gamut G21 to the Lab gamut G2 indicated by the above-mentioned magnification ratio α. The following equations assume magnification ratios (rates of change) for the components r, θ, and φ to be αrp, αθp, and αφp. The values αrp, αθp, and αφp are magnification ratios from a given P' in the reduced Lab gamut G21 to the corresponding P in the Lab gamut G2 and vary with grids.

[Equation 4] (4)
$$\alpha r_p = \frac{r_p}{r_{p'}}$$

[Equation 5] (5)
$$\alpha\theta_p = \begin{cases} \theta_p - \theta_{p'} & (-\pi \leq \theta_p - \theta_{p'} \leq \pi) \\ \theta_p - \theta_{p'} + 2\pi & (\theta_p - \theta_{p'} < -\pi) \\ \theta_p - \theta_{p'} - 2\pi & (\theta_p - \theta_{p'} > \pi) \end{cases}$$

[Equation 6] (6)
$$\alpha\phi_p = \begin{cases} \phi_p - \phi_{p'} & (-\pi \leq \phi_p - \phi_{p'} \leq \pi) \\ \phi_p - \phi_{p'} + 2\pi & (\phi_p - \phi_{p'} < -\pi) \\ \phi_p - \phi_{p'} - 2\pi & (\phi_p - \phi_{p'} > \pi) \end{cases}$$

The above-mentioned process is used to find magnification ratios for all the grids in the reduced Lab gamut G21.

The next purpose is to determine a magnification ratio from the reduced Lab range R21 to the Lab range R2 and to calculate the Lab range R2. The above-mentioned technique is used to find the magnification ratio α from the reduced Lab gamut G21 to the Lab gamut G2. The magnification ratio α is used to find the magnification ratio α' from the reduced Lab range R21 to the Lab range R2. Further, the magnification ratio α' is used to find the Lab range R2. With respect to grids inside the reduced Lab gamut G21 in the reduced Lab range R21, the magnification ratio α for each grid of the reduced Lab gamut G21 is interpolated to find the magnification ratio α' for the reduced Lab range R21. By contrast, with respect to grids outside the reduced Lab gamut G21 in the reduced Lab range R21, a line is formed by connecting each grid coordinate in the reduced Lab range R21 with the Lab reduction center C2. That line crosses the surface of the reduced Lab gamut G21 at an intersecting point that provides a magnification ratio as the magnification ratio α'.

In this manner, the magnification ratio α'Q is found with respect to a given grid Q' in the reduced Lab range R21 and can be used to find the corresponding grid Q in the Lab range R2. The grid Q in the Lab space is represented as (LQ, aQ, bQ) according to the rectangular coordinate system and is represented as follows according to the polar coordinate system (rQ, θQ, φQ). It is assumed that rQ, θQ, and φQ are found from equations (1) through (3) and are offset against the Lab reduction center C2=(Lc, ac, bc).

[Equation 7]
$$L_Q = r_Q \cos\theta_Q + L_c \quad (7)$$

[Equation 8]
$$a_Q = r_Q \sin\theta_Q \cos\phi_Q + a_c \quad (8)$$

[Equation 9]
$$b_Q = r_Q \sin\theta_Q \sin\phi_Q + b_c \quad (9)$$

The same equations can be used to find LQ', aQ', and bQ' with respect to a given coordinate Q' in the reduced Lab range R21. Accordingly, Q' is converted into Q by α'Q and can be represented as follows.

[Equation 10]
$$L_Q = \alpha r'_Q r_{Q'} \cos(\theta_{Q'} + \alpha\theta'_Q) + L_c \quad (10)$$

[Equation 11]
$$a_Q = \alpha r'_Q r_{Q'} \sin(\theta_{Q'} + \alpha\theta'_Q)\cos(\phi_{Q'} + \alpha\phi'_Q) + a_c \quad (11)$$

[Equation 12]
$$b_Q = \alpha r'_Q r_{Q'} \sin(\theta_{Q'} + \alpha\theta'_Q)\sin(\phi_{Q'} + \alpha\phi'_Q) + b_c \quad (12)$$

where αr'Q, αθ'Q, and αφ'Q denote components of the magnification ratio α' for the grid Q' in the reduced Lab range R21.

The addition theorem is used to modify equations (10) through (12) as follows.

[Equation 13]

$$L_Q = \alpha r'_{Q'} r_{Q'}(\cos\theta_{Q'}\cos\alpha\theta'_Q - \sin\theta_{Q'}\sin\alpha\theta'_Q) + L_c \quad (13)$$

[Equation 14]

$$a_Q = \alpha r'_{Q'} r_{Q'}(\sin\theta_{Q'}\cos\alpha\theta'_Q + \cos\theta_{Q'}\sin\alpha\theta'_Q)(\cos\phi_{Q'}\cos\alpha\phi'_Q - \sin\phi_{Q'}\sin\alpha\phi'_Q) + a_c \quad (14)$$

[Equation 15]

$$b_Q = \alpha r'_{Q'} r_{Q'}(\sin\theta_{Q'}\cos\alpha\theta'_Q + \cos\theta_{Q'}\sin\alpha\theta'_Q)(\sin\phi_{Q'}\cos\alpha\phi'_Q + \cos\phi_{Q'}\sin\alpha\phi'_Q) + b_c \quad (15)$$

These equations are unified into a vector equation as follows.

[Equation 16]

$$\begin{pmatrix} L_Q \\ a_Q \\ b_Q \end{pmatrix} = \alpha r'_Q \left[ A \begin{pmatrix} r_{Q'}\cos\theta_{Q'} \\ r_{Q'}\sin\theta_{Q'}\cos\phi_{Q'} \\ r_{Q'}\sin\theta_{Q'}\sin\phi_{Q'} \end{pmatrix} + \begin{pmatrix} -r_{Q'}\sin\theta_{Q'}\sin\alpha\theta_Q \\ 0 \\ 0 \end{pmatrix} \right] + \begin{pmatrix} L_c \\ a_c \\ b_c \end{pmatrix}$$

$$= \alpha r'_Q \left[ A \begin{pmatrix} L_{Q'} \\ a_{Q'} \\ b_{Q'} \end{pmatrix} + \begin{pmatrix} -r_{Q'}\sin\theta_{Q'}\sin\alpha\theta_Q \\ 0 \\ 0 \end{pmatrix} \right] + \begin{pmatrix} L_c \\ a_c \\ b_c \end{pmatrix}$$

$$A = \begin{pmatrix} \cos\alpha\theta'_Q & 0 & 0 \\ \sin\alpha\theta'_Q(\cos\phi_{Q'}\cos\alpha\phi'_Q - \sin\phi_{Q'}\sin\alpha\phi'_Q) & \cos\alpha\theta'_Q\cos\alpha\phi'_Q & -\cos\alpha\theta'_Q\sin\alpha\phi'_Q \\ \sin\alpha\theta'_Q(\sin\phi_{Q'}\cos\alpha\phi'_Q + \cos\phi_{Q'}\sin\alpha\phi'_Q) & \cos\alpha\theta'_Q\sin\alpha\phi'_Q & \cos\alpha\theta'_Q\cos\alpha\phi'_Q \end{pmatrix}$$

(16)

The first equation of equation (16) indicates that the grid Q of the Lab range R2 is found from the grid Q' of the reduced Lab range R21 and the corresponding magnification ratio α'Q. A is a matrix that can be expressed by the second equation of equation (16). The above-mentioned process can be used to find Lab values of the grids in the Lab range R2.

When the ICC profile 26 is created based on the Lab values obtained from the above-mentioned technique, the Lab space is generally conditioned to be $0 \leq L^* \leq 100$, $-128 \leq a^*$, and $b^* \leq 127$. If the found Lab range R2 exceeds this range, the Lab range R2 needs to be compressed into the specified range. The method is described below. The first step is to find the magnification ratio α' and the Lab range R2 only for grids equivalent to the outline of the reduced Lab range R21. These grids naturally contain grids corresponding to pure white and pure black in the RGB range R1. The grids are then standardized using coordinate values in the Lab range R2 corresponding to the grids for pure white and pure black so that the pure white becomes (100, 0, 0) and the pure black becomes (0, 0, 0). The embodiment provides the standardization by converting the Lab space into the XYZ space, standardizing the grids in the XYZ space, and then converting the XYZ space back into the Lab space.

Then, the mapping is applied to the obtained grids that belong to the outline of the Lab range R2 outside the range. This mapping is not a complicated process. According to the embodiment, the mapping aims at preserving the complete brightness. The mapping target is a rectangular solid represented by the range. Accordingly, the embodiment uses the method that can be simply implemented. In this case, the mapped grids for the outline of the Lab range R2 indicate that the first obtained Lab coordinate values naturally differ from those obtained after the mapping. That is to say, a different scaling factor must be used for the magnification ratio α' found for the corresponding reduced Lab range R21. Otherwise, grids in the reduced Lab range R21 cannot yield coordinate values for the mapped grids in the Lab range R2. To solve this problem, equations (4) through (6) are used to again find the magnification ratio α' using coordinate values for the Lab range R2 after mapping and the corresponding coordinate values for the reduced Lab range R21. Of course, P and P' in equations (4) through (6) correspond to the coordinate Q for the Lab range R2 and the coordinate Q' for the reduced Lab range R21, respectively.

Then, a coordinate value is calculated for the grid Q within the Lab range R2 between the outline of the Lab gamut G2 and the outline of the Lab range R2. The coordinate Q' corresponds to the grid Q and exists between the outline of the reduced Lab gamut G21 and the outline of the reduced Lab range R21. A line is formed by connecting the coordinate Q' with the Lab reduction center C2 and crosses the outline of the reduced Lab gamut G21 at an intersecting point S1 to be assumed. The same line crosses the outline of the reduced Lab range R21 at an intersecting point S2 to be assumed. The points S1 and S2 are assumed to correspond to magnification ratios αS1 and α'S2. Both can be found by interpolating the reduced Lab gamut G21 and the reduced Lab range R21. The magnification ratios αS1 and α'S2 are mixed with each other based on a ratio of the distance between the coordinate Q' and S1 to the distance between the coordinate Q' and S2 to find the magnification ratio α'Q corresponding to the coordinate Q'. Equation (16) is used to find the coordinate value of the grid Q for the Lab range R2 located between the outline of the Lab gamut G2 and the outline of the Lab range R2 using the magnification ratio α'Q and the coordinate Q' found in this manner. The use of such technique enables compression to an intended region without sacrificing gradation properties as resulting from simple clipping. Since the compressed region is located outside the Lab gamut G2 where the true value is obtained, the compression is available without degrading the accuracy in the Lab gamut G2.

The above-mentioned technique can be used to find grids in the Lab range R2 corresponding to grids in the RGB range R1. The following describes the method of acquiring Lab coordinate values corresponding to given RGB in the RGB range R1. In this case, there is predetermined correspondence between a grid in the RGB range R1 and a grid in the Lab range R2. An interpolation operation just needs to be used to find a Lab coordinate value corresponding to a given RGB coordinate value. When an input RGB value exists in the RGB gamut G1, however, improved accuracy is expected by using the Lab gamut G2 to find Lab values. Only in such region, an interpolation operation is performed to find Lab values using the Lab gamut G2 corresponding to the RGB gamut G1.

(3) Conclusion

Figure 10:
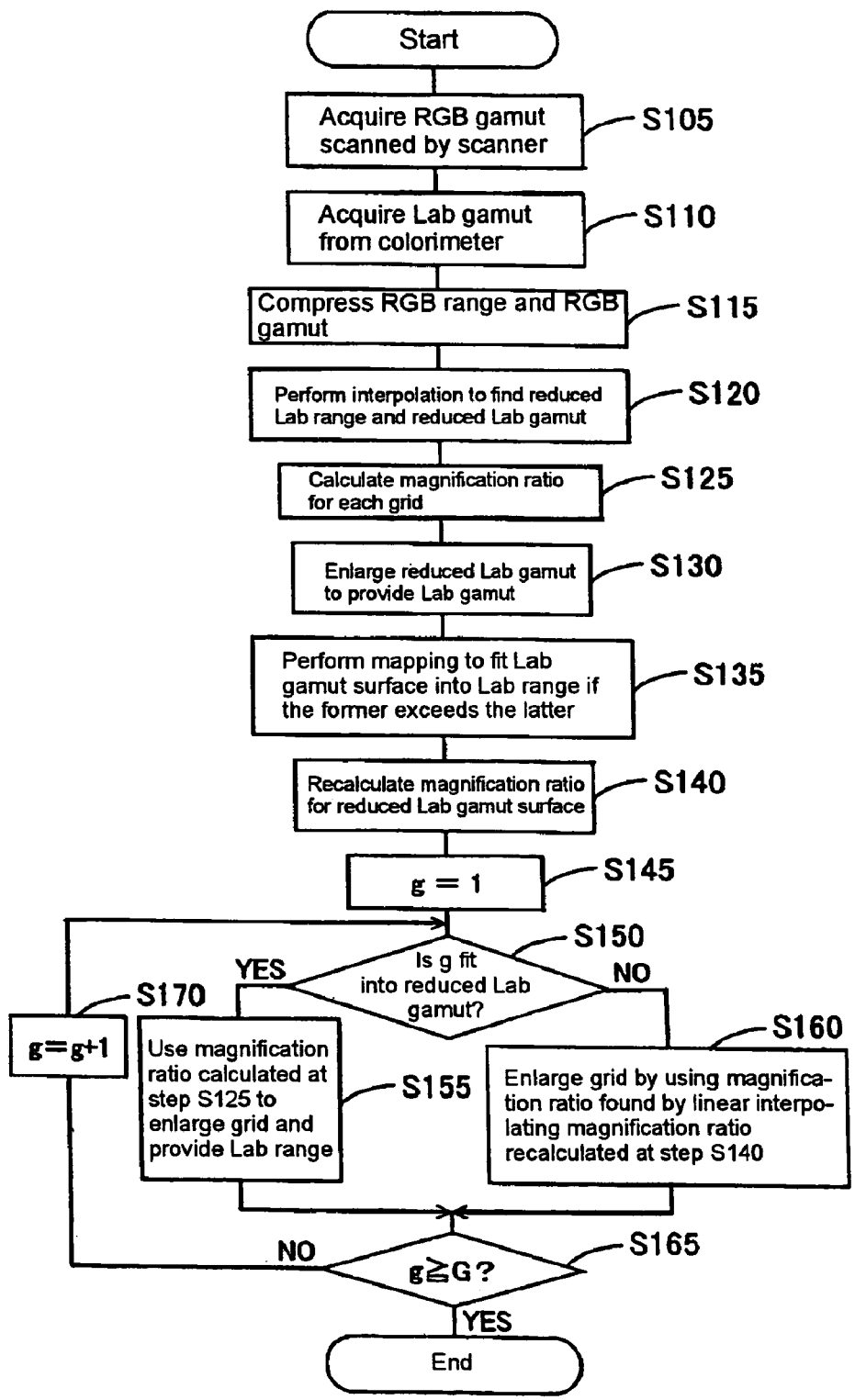
FIG. 10 is a flowchart showing the contents of a profile creation process.

The above-mentioned process is described with reference to a flowchart in FIG. 10. In FIG. 10, the scanner 40 acquires the RGB gamut G1 (step S105). The calorimeter 41 acquires the Lab gamut G2 (step S110). An interpolation is performed to find the reduced Lab range R21 and the reduced Lab gamut G21 corresponding to the reduced RGB range R11 and the reduced RGB gamut G11 (steps S115 and S120). The reduced RGB range R11 and the reduced RGB gamut G11 are compressed against the RGB compression center C1 so as to fit the RGB range R1 and the RGB gamut G1 into the RGB gamut G1. The magnification ratio α is found for each grid based on the relationship between the reduced Lab gamut G21 and the Lab gamut G2 (step S125). Then, the magnification ratio for the surface of the reduced Lab range R21 is assumed to be that for the surface of the reduced Lab gamut G21. The reduced Lab range R21 is enlarged to provide the Lab range R2 (step S130). When the value for the surface of the Lab range R2 exceeds the Lab range, the mapping is performed to fit the value into the Lab range R2 (step S135). The magnification ratio α' is recalculated according to the relationship between the mapped surface of the Lab range R2 and the reduced Lab range R21 (step S140). When the grid exists in the reduced Lab gamut G21 (steps S145 and S150), the magnification ratio α is used to enlarge the Lab value of the grid and provide the Lab range R2 (step S155). When the grid does not exist in the reduced Lab gamut G21, the grid is enlarged by using a magnification ratio found by linear interpolating the magnification ratio α' (step S160). This process is performed for all grids (steps S165 and S170) to create the ICC profile 26 based on an enlarged result. In this manner, the embodiment once reduces the RGB range R1 and the RGB gamut G1 and then implements the extrapolation. This makes it possible to minimize a failure in the extrapolation region for the ICC profile 26.

What is claimed is:

1. A profile creation method of creating a profile to define correspondence between a first color space range expressed by a device-dependent component coordinate and a second color space range expressed by a device-independent component coordinate corresponding to said first color space range, said method comprising:

a first gamut acquisition step of acquiring a first gamut for said first color space range based on a chart supplied from a specified input device;

a second gamut acquisition step of measuring a color in said chart and acquiring a second gamut for said second color space range;

a first reduced region acquisition step of acquiring a reduced first color space range by reducing said first color space range into said first gamut and acquiring a reduced first gamut by reducing said first gamut based on a corresponding reduction ratio;

a second reduced region acquisition step of acquiring a reduced second color space range and a reduced second gamut corresponding to said reduced first color space range and said reduced first gamut based on a specified interpolation algorithm;

a magnification ratio calculation step of calculating a first magnification ratio corresponding to said second gamut for each grid in said acquired reduced second gamut and calculating a second magnification ratio from a reduced second color space range to a second color space range based on said calculated first magnification ratio; and a profile creation step of calculating a second color space range based on said calculated second magnification ratio and creating a profile defining correspondence between said first color space range and said second color space range based on a calculation result.

2. The profile creation method according to claim 1, wherein said first reduced region acquisition step reduces said first color space range into a first gamut by allowing at least one point on an outline of said reduced first color space range to correspond to an outline of said first gamut.

3. The profile creation method according to claim 1, wherein said magnification ratio calculation step calculates said first magnification ratio and said second magnification ratio based on a polar coordinate system in a color space for said grid.

4. The profile creation method according to claim 1, wherein said magnification ratio calculation step calculates said second magnification ratio using an interpolation operation corresponding to said first magnification ratio.

5. The profile creation method according to claim 1, wherein said magnification ratio calculation step forms a line by connecting a reduction center to a coordinate of a grid in said reduced second color space range outside said reduced second gamut, allows the line to intersect with a surface of said reduced second gamut at an intersecting point, and uses a magnification ratio obtained from this intersecting point as a second magnification ratio.

6. The profile creation method according to claim 1, wherein, when said calculated second color space range exceeds an allowable range, said profile creation step creates said profile by compressing said calculated second color space range to said allowable range.

7. A profile creation apparatus for creating a profile to define correspondence between a first color space range expressed by a device-dependent component coordinate and a second color space range expressed by a device-independent component coordinate corresponding to said first color space range, said apparatus comprising:

a first gamut acquirer for acquiring first gamut for said first color space range based on a chart supplied from a specified input device;

a second gamut acquirer for measuring a color in said chart and acquiring a second gamut for said second color space range;

a first reduced region acquirer for acquiring a reduced first color space range by reducing said first color space range into said first gamut and acquiring a reduced first gamut by reducing said first gamut based on a corresponding reduction ratio;

a second reduced region acquirer for acquiring a reduced second color space range and a reduced second gamut corresponding to said reduced first color space range and said reduced first gamut based on a specified interpolation algorithm;

a magnification ratio calculator for calculating a first magnification ratio corresponding to said second gamut for each grid in said acquired reduced second gamut and calculating a second magnification ratio from a reduced second color space range to a second color space range based on said calculated first magnification ratio; and a profile creator for calculating a second color space range based on said calculated second magnification ratio and creating a profile defining correspondence between said first color space range and said second color space range based on a calculation result.

* * * * *